United States Patent
Löbig (10) Patent No.: US 7,940,745 B2
(45) Date of Patent: May 10, 2011

(54) FLEXIBLE AND ECONOMICAL PROVISION OF SERVICE CHARACTERISTICS FOR VOICE TRANSMISSION IN A PACKET NETWORK

(75) Inventor: Norbert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1088 days.

(21) Appl. No.: 10/491,075

(22) PCT Filed: Sep. 12, 2002

(86) PCT No.: PCT/DE02/03404
§ 371 (c)(1),
(2), (4) Date: Mar. 26, 2004

(87) PCT Pub. No.: WO03/032591
PCT Pub. Date: Apr. 17, 2003

(65) Prior Publication Data
US 2004/0246941 A1    Dec. 9, 2004

(30) Foreign Application Priority Data
Sep. 28, 2001 (DE) .................. 101 47 873

(51) Int. Cl.
*H04L 12/66* (2006.01)
*H04J 3/16* (2006.01)
(52) U.S. Cl. ......................... 370/352; 370/465
(58) Field of Classification Search ............. None
See application file for complete search history.

(56) References Cited

U.S. PATENT DOCUMENTS

| 6,118,864 | A | 9/2000 | Chang et al. | |
|---|---|---|---|---|
| 6,282,192 | B1 * | 8/2001 | Murphy et al. | 370/352 |
| 6,529,499 | B1 * | 3/2003 | Doshi et al. | 370/352 |
| 6,611,591 | B1 * | 8/2003 | McNiff et al. | 379/268 |
| 6,754,180 | B1 * | 6/2004 | Christie | 370/236 |

(Continued)

OTHER PUBLICATIONS

A. Miloslavski, V. Antonov, L. Yegoshin and S. Shkrabov, "Third-party Call Control in VoIP Networks for Call Center Applications", IEEE Intelligent Network Workshop, 2001, pp. 161-167.

(Continued)

*Primary Examiner* — Michael J Moore, Jr.
*Assistant Examiner* — Marcus R Smith
(74) *Attorney, Agent, or Firm* — Laurence A. Greenberg; Werner H. Stemer; Ralph E. Locher (57) ABSTRACT

The invention relates to a method, an arrangement and a system for rerouting the useful data flow in a packet network within the frame of a service, whereby the resources for executing said service are provided in the area for action of a switching center. According to said invention, a packet converter is provided in the area for action of said switching center and, within the frame of said service, the useful data flow is carried through the packet converter. The adaptations, which are necessary for rerouting said useful data flow, are executed in said packet converter. The present invention has the advantage that only the switching center, which is responsible for the resource allocation, is concerned when the useful data flow is rerouted. Inter-exchange signaling with other switching centers is thus substantially reduced. Another advantage is that rerouting of said useful data flow does not depend on the performance characteristics of the other switching centers, which are involved, for example, in the setting-up of a call.

21 Claims, 5 Drawing Sheets

U.S. PATENT DOCUMENTS

| | | | |
|---|---|---|---|
| 6,765,912 B1 * | 7/2004 | Vuong | 370/395.2 |
| 6,807,150 B1 * | 10/2004 | McNiff et al. | 370/230 |
| 6,832,254 B1 * | 12/2004 | Scoggins et al. | 709/227 |
| 6,876,646 B1 * | 4/2005 | Dore et al. | 370/352 |
| 6,888,839 B1 * | 5/2005 | Scoggins et al. | 370/410 |
| 7,035,260 B1 * | 4/2006 | Betta et al. | 370/392 |
| 7,257,201 B2 * | 8/2007 | Singh et al. | 379/88.13 |
| 2001/0005382 A1 | 6/2001 | Cave et al. | |
| 2002/0159439 A1 * | 10/2002 | Marsh et al. | 370/352 |

OTHER PUBLICATIONS

Kurt Schertenleib, "Signalisierung in konvergenten Netzen", Funkscau, vol. 13, Jun. 15, 2001, pp. 36-39.

Wolfgang Pauler, "Kopplung von Sprach-und Datennetzen", Funkschau, vol. 8, Mar. 31, 2000, pp. 53-54.

* cited by examiner

FLEXIBLE AND ECONOMICAL PROVISION OF SERVICE CHARACTERISTICS FOR VOICE TRANSMISSION IN A PACKET NETWORK

CROSS REFERENCE TO RELATED APPLICATIONS

This application is the US National Stage of International Application No. PCT/DE02/03404, filed Sep. 12, 2002 and claims the benefit thereof. The International Application claims the benefits of German application No. 10147873.9 DE filed Sep. 28, 2001, both of the applications are incorporated by reference herein in their entirety.

FIELD OF INVENTION

The invention relates to a method, an arrangement and a system for rerouting the useful data stream in a packet network within the framework of a service, in which the resources for realizing the service are provided in the area of responsibility of a switching center.

BACKGROUND OF INVENTION

In circuit-switched telephony, also referred to by the acronym PSTN (public switched telephone network), subscribers of the public telephone network are connected to the switching systems of the public switching technology assigned to them or responsible for them. Using subscriber access concentrators or subscriber access networks, frequently just referred to as access networks, located upstream of the switching-system, the subscriber accesses can be combined, but the result of this however is still circuit-based access by the switched subscriber to the switching system. The combining of the subscriber accesses is generally implemented using Time Division multiplexing—frequently abbreviated to TDM—for example PCM (Pulse Code Modulation) or SDH (Synchronous Digital Hierarchy).

Within the context of the growth in services which are based on variable bit rates, the subscribers of the public telephone network increasingly have access to packet networks, namely access to the Internet via broadband transmission networks such as LANs (Local Area Networks), networks based on DSL (Digital Subscriber Line) technology or cable networks. For subscribers with access to a packet network the obvious course is to use the lines or networks necessary for packet-based access for telephone traffic as well, instead of maintaining separate narrowband lines/networks.

For PSTN subscribers who access a packet-based network there is subscriber network access equipment such as IADs (Integrated Access Devices) or cable modems which terminate the subscriber-side transmission network, for example LAN (Local Area Network), network with DSL (Digital Subscriber Line) accesses or cable network. On the subscriber side this type of network access equipment has analog or ISDN (Integrated Services Digital Network) accesses; On the packet network side telephony signaling and useful data with certain security protocols are transmitted.

As well as this there are packet-based terminals, telephones based on the Internet protocol (IP) for example, with signaling protocols specifically defined for use in the packet network, such as the H.323 Standard defined by the International Telecommunications Union (ITU) or the SIP (Session Initiation Protocol) in accordance with the IETF (Internet Engineering Task Force) Standard.

Connection setup and connection control of telecommunications applications via packet networks generally involves a switching center which executes functions such as access control, signaling, call control and billing. This switching center can for example include an appropriately equipped server in the IP network—frequently called a gatekeeper—or a PSTN (public switched telephone network) switching system equipped for these additional packet network-related functions. In addition local resources for control or supervision functions can be provided in the network access equipment.

With conventional circuit-switched PSTN/ISDN connections many of the service features are based on the fact that the user channel is switched in the switching center and the necessary call processing resources are provided there as needs dictate.

Figure 1:
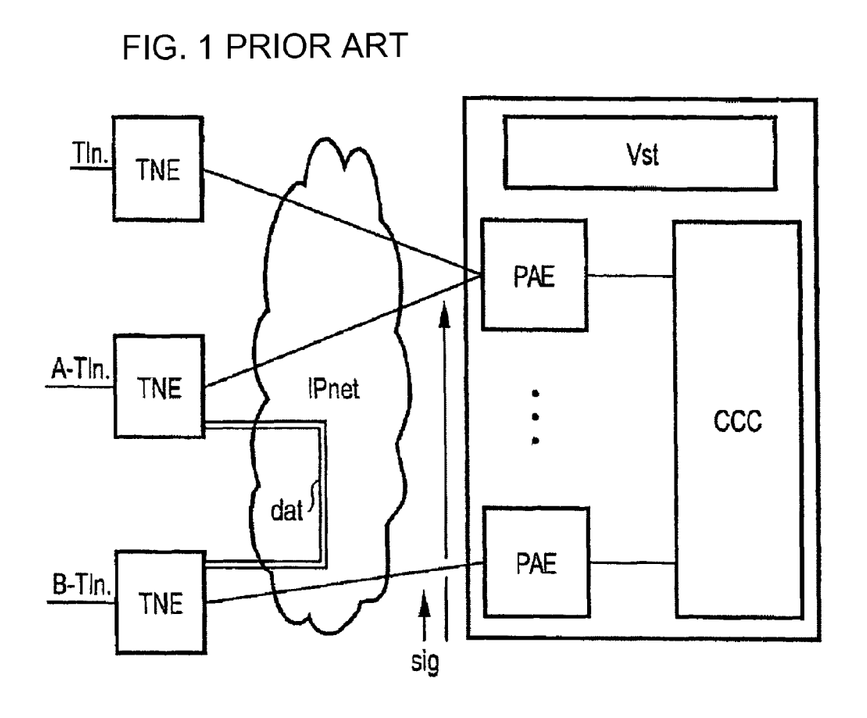
FIG. 1: Connection with useful data transmission over a packet network for two subscribers in the area of responsibility of a switching center

An arrangement for packet data transmission over a packet network IPnet is shown in FIG. 1. For the connection of subscribers A-Tln and B-Tln the useful data dat is transmitted directly between subscriber devices TNE transmission, to which the two subscribers involved A-Tln and B-Tln are connected. The signaling information sig is routed separately from the useful data via a switching center Vst. The figure shows a switching center Vst with a Call Control Core CCC with an upstream packet-based adaptation unit PAE. Since the useful data dat is not routed in the switching center Vst, conventional resources, i.e. those available in PSTN networks, provided in the switching center Vst can no longer be made available for specific service features. Therefore the call processing resources are relocated and provided in the packet network IPnet in resource servers with specific functionality (e.g. Interactive Voice Response servers for interactive voice input/output, Conference servers for telephone conferences) or in subscriber-related equipment (e.g. network access equipment, Media Gateways etc.).

If services are requested by the A-side or the B-side in a connection, this frequently leads to a redirection or to a modified routing of the useful data. The useful data stream between A- and B-subscriber is generally to be divided up in at least one direction and directed to the relevant resource servers.

Figure 2:
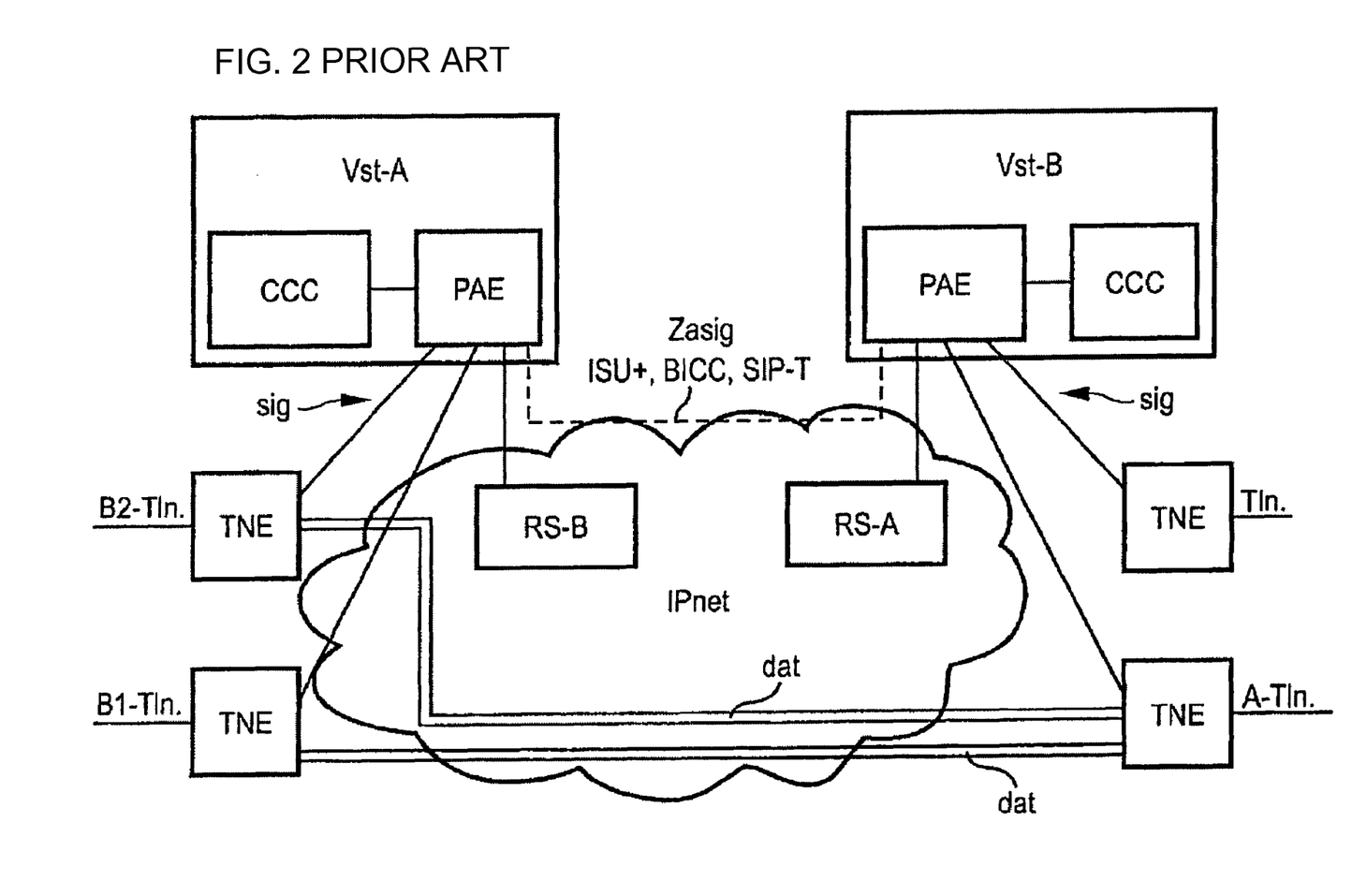
FIG. 2: Rerouting of useful data within the context of a connection with useful data transmission over a packet network (Call Transfer)
Figure 3:
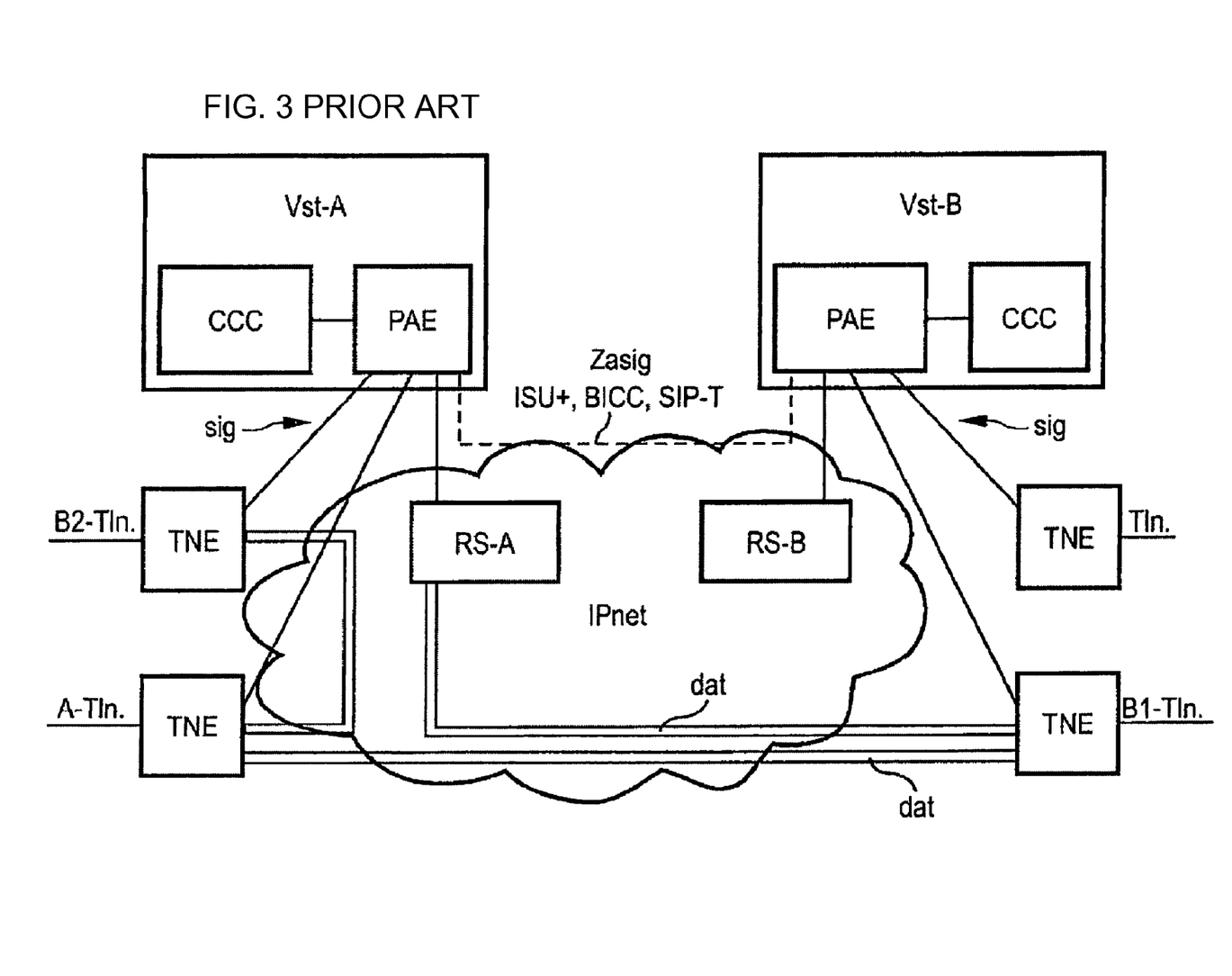
FIG. 3: Rerouting of useful data within the context of a connection with useful data transmission over a packet network (Call Hold)

FIGS. 2 and 3 show two examples of the redirection of the useful data stream dat for implementing telecommunication services within the framework of a packet network-based connection of subscribers. By contrast with FIG. 1 the subscribers involved are in the area of responsibility of different switching centers Vst-A and Vst-B, positioned in the vicinity of the subscribers in each case. The signaling data sig for the subscribers B1-Tln and B2-Tln (FIG. 2) or A-Tln and B2-Tln (FIG. 3) passes from the equipment assigned to the subscribers TNE via the local switching center Vst-A. The signaling data sig of subscribers A-Tln and Tln (FIG. 2) or B1-Tln and Tln (FIG. 3) is routed via the local switching center Vst-B. The switching centers Vst-A and Vst-B each feature packet adaptation equipment PAE and Call Control Core CCC. To implement the service features the switching centers Vst-A and Vst-B are each connected to a Resource Server RS-B and RS-A (FIG. 2) or RS-A and RS-B (FIG. 3). Signaling zasig (zasig: for interoffice signaling) between the switching centers Vst-A and Vst-B can for example be undertaken with the aid of an expanded ISUP (ISDN user part) protocol, the BICC (bearer independent call control) protocol or the T-SIP (telephone session initiation protocol) protocol for packet network applications.

In the example of FIG. 2 the useful data stream dat of a connection between the subscribers A-Tln and B1-Tln is rerouted for a connection between the subscribers A-Tln and B2-Tln. This is referred to as a call transfer, which is initiated to forward a subscriber's call for example. FIG. 3 shows a rerouting of the useful data stream dat, in which a connection between the subscriber A-Tln and B1-Tln is interrupted, so that subscriber A-Tln can consult with subscriber B2-Tln. The call of subscriber B1-Tln is applied to the Resource Server RS-A. Music or a recorded announcement may be played while subscriber Tln-B1 is connected to the Resource Server RS-A. After the connection between subscriber A-Tln and B2-Tln is ended the original connection is restored.

For the call processing service features shown in FIGS. 2 and 3 the switching center Vst-B must be informed by interoffice signaling zasig about the changed routing and change its packet address assignment in a stable call state, even a number of times if necessary. Handling local, subscriber-related service features leads to additional signaling load in the interoffice signaling zasig, i.e. the signaling between the switching centers assigned to the subscriber and where necessary further intermediate switching centers and to additional adaptation in the remote switching centers. The necessary adaptation, such as changing the packet network addresses, must be supported by the remote switching centers, which is a very restrictive assumption for the network and its interoffice signaling or conversely determines the availability of the relevant service features depending on the relevant parties to the call. Even if the switching centers support the concurrent updating of the packet network addresses of their useful data stream, negative effects on the service quality can still arise from delays in the packet network and long delay times in interoffice signaling.

SUMMARY OF INVENTION

The object of the invention is to improve the implementation of services in which the routing of the useful data stream in the packet network is changed.

The object is achieved by the objects of claims 1, 9 and 13.

With the method in accordance with the invention a packet converter is provided in the area of responsibility of the switching center, i.e. the packet converter is controlled and monitored by the switching center. Within the framework of the service which demands rerouting of the useful data stream, the useful data stream is routed via the packet converter. The adaptations for the rerouting of the useful data stream are undertaken in the packet converter (Claim 1). The adaptations can include changes of address and parameter information (Claim 2) such as IP addresses for IP protocol-based networks (Claim 3).

The method in accordance with invention has the advantage that only the switching center with responsibility for providing the resources is involved in the rerouting of the useful data stream. Only one switching center is responsible for provision of the resources and the adaptations for the rerouting of the useful data stream. The interoffice signaling which may possibly be routed separately from the useful data over a parallel switching network (Claim 4) is significantly reduced by this.

The signaling connected with the changes as part of the rerouting of the useful data only relates to the area of responsibility of the switching center and does not thus execute any additional interoffice signaling. A further advantage is that the rerouting of the useful data stream does not depend on the service features of other switching centers which are involved in connection setup for example.

With a telecommunication service the need to route the useful data stream via a packet converter can be determined on the basis of the directory number of a terminal or packet network-related address information of subscriber-related equipment (Claim 5). Rerouting of the useful data stream for example within the framework of a voice connection for the purposes of a conference connections or an automatic voice output (Claim 6) can be undertaken in this way.

The functions of the packet converter can be provided in a server (Claim 7) or in network equipment (Claim 8).

A packet converter can be implemented with the aid of program structures which emulate the functions of to network access devices or gateway devices connected against each other with the TDM (time division multiplexing) side for conversion of data between TDM-based network and packet network, e.g. Media Gateways, (Claim 13). Packet conversion can be undertaken with a corresponding series connection of a packet network/TDM network network access device and a TDM network/packet network network access device. As with a gateway an assignment of packets to TDM channels dictated by the packet address of the remote subscriber equipment can be undertaken and a subsequent assignment between channels to packets with destination addresses given by the rerouting. This conversion is as a rule of not realized by two network access devices or media gateways but with the aid of program structures which provide or emulate the functions for conversion. The packet converter can for example consist of a server with packet-based useful data and signaling interfaces which behaves with regard to the conversion functions like a series circuit of a packet network/TDM network access device and a TDM network/packet network access device.

For each through connection of a useful data stream two orders or sequences of orders of then signaled to the packet converter by the switching center, with one relating to the conversion of a packet network data stream into a TDM data stream and one to the conversion of a TDM data stream into a packet network data stream (Claim 9).

The packet converter in accordance with the invention forms a system with the switching center from which it can be adjusted and controlled (Claim 14), in which the system-internal signaling is dependent on possible interoffice signaling. For example, for exchange of signaling information between the switching center and the packet converter the MGCP (media gateway control protocol) protocol or the H.248 protocol standardized by the ITU (International Telecommunications Union) can be used (Claim 15). The signaling protocol with which the signaling information is transferred for a rerouting in accordance with the invention of the useful data stream can be determined independently of the protocol used for interoffice signaling. This is useful to the extent that in some cases protocols to are used for the interoffice signaling, which have been expanded in a proprietary manner (e.g. an expanded version of the ISUP (ISDN user part) protocol) or protocols for which parts are still being standardized (e.g. BICC (bearer independent call control) protocol). In addition the method offers the opportunity of expanding the protocol used between the switching center and the packet converter in a proprietary way, without signaling protocols for interoffice signaling having to be changed (Claim 16). In this way, by changes in the area of responsibility of the switching center, service features can be influenced on rerouting or new service features generated depending on requirements. One useful effect in this case is that any possible Resource Server (Claim 17) also falls into the area of responsibility of the switching center for implementing the service features.

The greatest possible flexibility in the provision of service features is achieved by providing a packet converter on both sides of a connection in the packet network, so that on the A- and B-side service features can be provided without interoffice signaling. An advantageous further development of the object of the invention is a system of this type formed by two subsystems comprising a switching center and a packet converter assigned to the switching center in each case, with a useful data stream being able to be routed over a packet network between the two packet converters of the subsystem (Claim 18).

BRIEF DESCRIPTION OF THE DRAWINGS

The invention is explained in more detail below within the framework of exemplary embodiments on the basis of Figures. The drawings show.

DETAILED DESCRIPTION OF INVENTION

Figure 4:
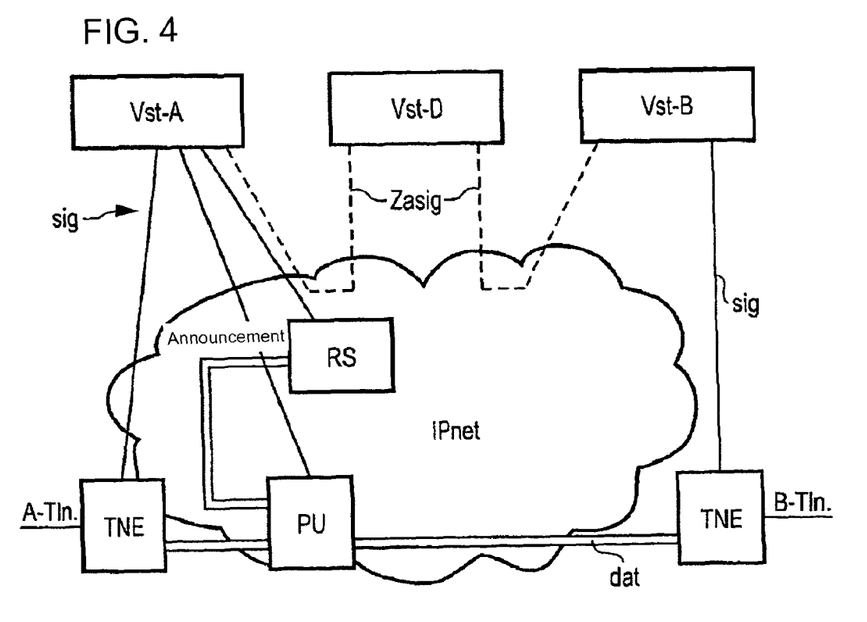
FIG. 4: Useful data rerouting in accordance with the invention with provision of the functions of the packet converter in a server
Figure 5:
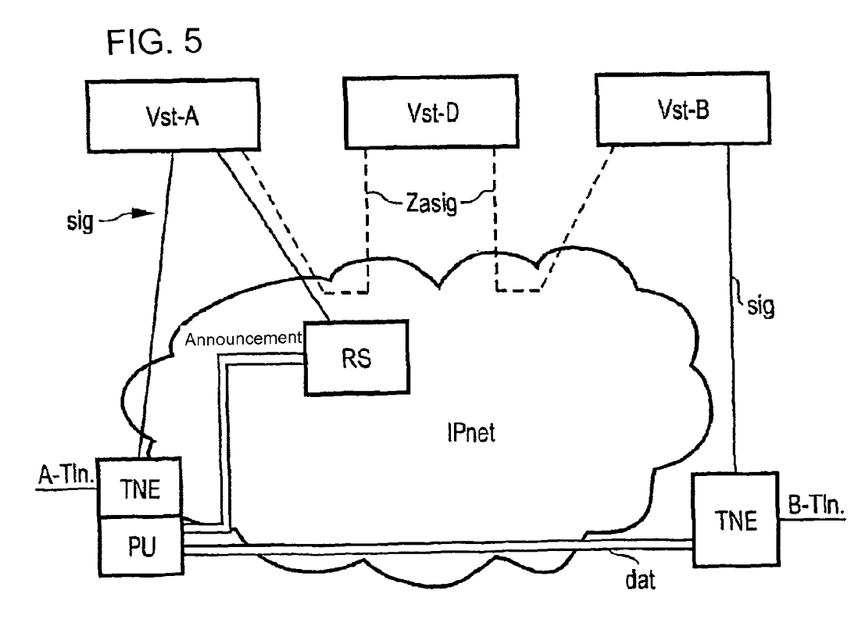
FIG. 5: Useful data rerouting in accordance with the invention with provision of the functions of the packet converter in subscriber equipment
Figure 6:
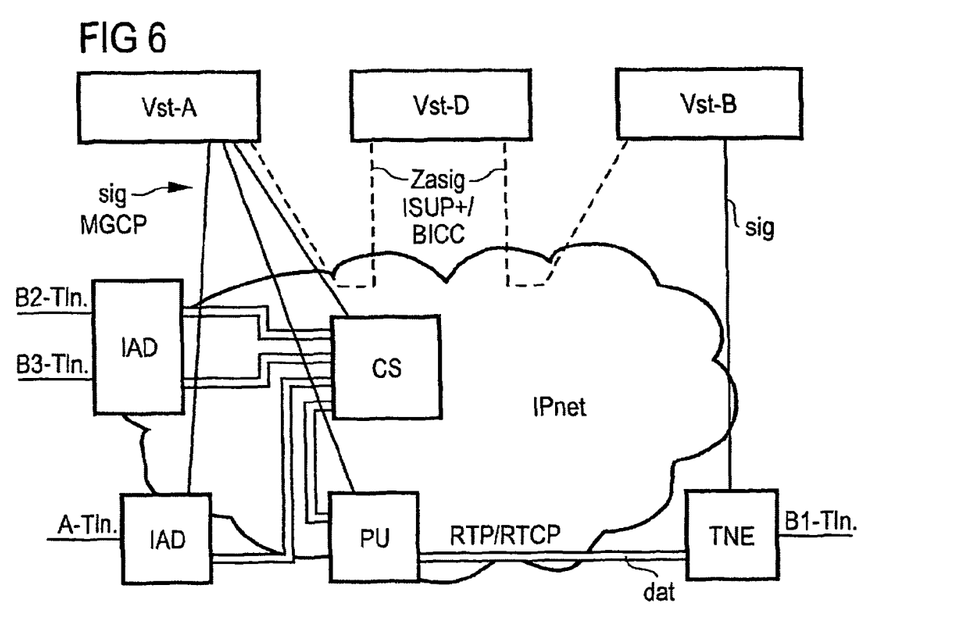
FIG. 6: Useful data rerouting controlled in accordance with the invention for a conference circuit

FIGS. 4-7 show two subscriber-related, local switching centers Vst-A and Vst-B as well as a transit switching center Vst-D. A Resource Server RS and a packet converter PU are located in the area of responsibility of switching center Vst-A in each case. The resource server in FIG. 6 is a Conference Server CS and in FIG. 7 an IVR (Interactive Voice Response) Server IVRS. The interoffice signaling shown in the arrangements depicted in FIGS. 4-7 passes between the local switching centers Vst-A and Vst-B via the transit switching center Vst-D. As part of the connection setup only the address information and parameter information needed for communication with the packet converter PU is exchanged between the local switching centers Vst-A and Vst-B. The initial settings for communication by remote subscribers with the packet converter PU remain unchanged up to connection setup. There is no interoffice signaling zasig for adaptation of the address parameters and connection parameters determined by the packet converter PU for communication with remote subscribers in the current connection for handling services with a purely local effect. Outside the area of responsibility of the switching center Vst-A routing remains unchanged when local services are activated.

FIGS. 4 and 5 show the concept underlying the invention on the basis of a connection between subscriber A-Tln and subscriber B-Tln, in which the speech information of subscribers A-Tln and B-Tln is transmitted via subscriber equipment TNE over a packet network IPnet. The connection is routed on the A-subscriber side via a packet converter PU. In this case the packet converter PU is implemented once in a server of the packet network (FIG. 4) and once in the equipment assigned to the subscriber TNE (FIG. 5). The area of responsibility of the local switching center Vst-A, in addition to the subscriber equipment assigned to the subscriber TNE, includes the packet converter PU and a Resource Server RS. The subscriber equipment assigned to the subscriber TNE, the packet converter PU and the Resource Server RS exchange signaling information sig with the local switching center Vst-A, in which case in FIG. 5 the functions of packet converter PU and subscriber equipment TNE are integrated. The useful data stream dat between the subscribers B-Tln and A-Tln is routed on the A-subscriber side via the packet converter PU. In accordance with the invention in the case of an A-subscriber side clearing of the connection to apply the B-subscriber to the Resource Server RS, the useful data stream dat in the section between the subscriber equipment assigned to be B-subscriber TNE and the packet converter PU is not changed. Rerouting is undertaken in the area of responsibility of the local switching center Vst-A of the A-subscriber A-Tln. Within the framework of the rerouting the connection between packet converter PU and A-subscriber, A-Tln is disconnected and the useful data stream dat diverted from the packet converter PU to the Resource Server RS or, in FIG. 5, forwarded to the Resource Server RS. For the rerouting only signaling information sig in the area of responsibility of the local switching center Vst-A of the A-subscriber A-Tln is exchanged between switching center Vst-A and the connected units, that is subscriber equipment TNE of the A-subscriber, Resource Server RS and packet converter PU. No interoffice signaling zasig is undertaken between the local switching centers Vst-A and Vst-B via the transit switching center Vst-D in the course of the useful data stream rerouting. The settings between subscriber equipment TNE of the B-subscriber B-Tln and packet converter PU remain unchanged for the switchover.

Figure 7:
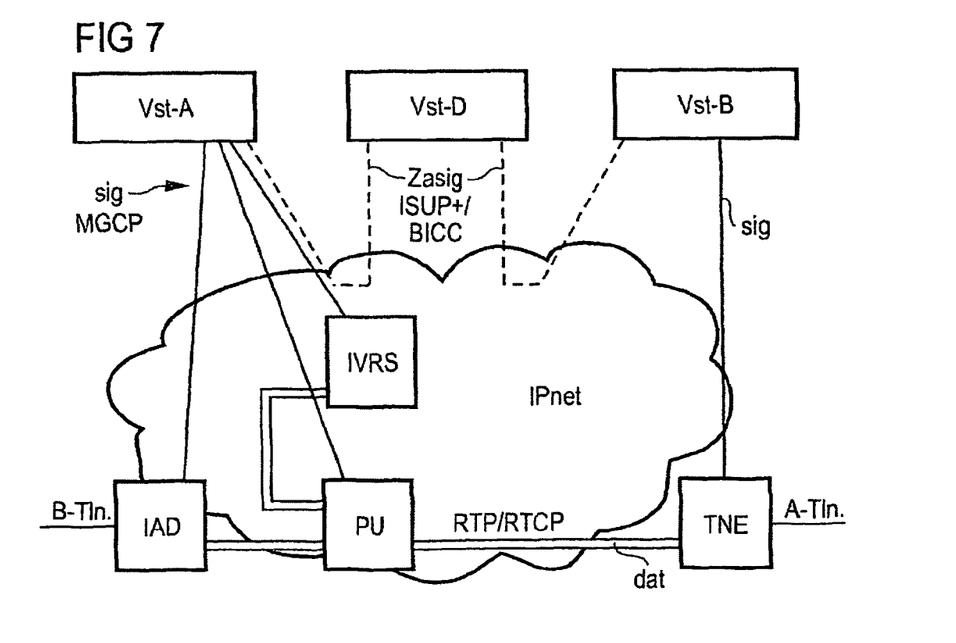
FIG. 7: Useful data rerouting controlled in accordance with the invention in connection with automatic speech output.

FIGS. 6 and 7 show examples of two services, in which by controlling the rerouting of the useful data in accordance with the invention, interoffice signaling zasig is reduced.

The first example (FIG. 6) relates to a conference circuit with rerouting of useful data dat via a packet converter PU. Under the control of a switching system Vst-A subscribers A-Tln, B2-Tln and B2-Tln have access via IADs (integrated access devices) with few subscriber ports to an IP-based packet network IPnet. Because of the restricted number of subscriber ports per IAD arrangements are frequently produced where subscribers who are in the area of responsibility of the same switching system but connected to different IADs communicate with each other. This is illustrated in FIG. 6 by the fact that two IADs are shown on the switching system Vst-A side, one of which is connected to the terminal of subscriber A-Tln and the other to the terminals of subscribers B2-Tln and B3-Tln. There are also two servers in the area of responsibility of switching system Vst-A, one of which provides the functions of the packet converter PU and the other resources for conference circuits CS. Subscribers A-Tln, B2-Tln and B3-Tln have PSTN terminals for example, connected via xDSL (digital subscriber line) links to the IADs. The signaling sig between the switching system Vst-A and the two IADs, the Conference Server CS as well as the packet converter PU is implemented with the aid of the MGCP (media gateway control protocol). For interoffice signaling zasig between the switching system Vst-A, of the transit switching center Vst-D and the B1-side local switching center Vst-B the BICC (bearer independent control protocol) or a proprietary version of the ISUP (ISDN user part) protocol ISUP+ used for transmission of useful data dat over the packet network IPnet is used. The useful data stream dat is transmitted with the aid of the RTP (real time protocol) and the RTCP (real time control protocol) which are frequently used for transmission of voice data in the IP network or control of transmission of voice data in the IP network.

For a typical application subscriber A-Tln calls the B1-subscriber Tln-B1 located outside the area of responsibility of switching system Vst-A. Because of the location of the B1-subscriber even during call setup, the switching system Vst-A causes the useful data stream dat to pass via the packet converter PU. In the course of the call subscriber A-Tln decides to include further subscribers Tln-B2 and Tln-B3 in the form of an audio conference. In this way he causes the useful data stream dat to be routed from subscriber Tln-A, Tln-B1, Tln-B2 and B3 via the Conference Server CS. This operation is however hidden to the local switching center Vst-B of the subscriber B1-Tln. The terminal of the B1-subscriber B1-Tln may be signaled the fact that there is a conference connection, but the routing of the useful data stream dat remains unchanged as far as the switching center Vst-B is concerned. In the control area of switching system Vst-A on the other hand useful data dat of the A-subscriber A-Tln is routed from the packet converter PU out to the Conference Server CS without the need for interoffice signaling.

FIG. 7 shows an example of how the invention results in a reduction in signaling load in the operation of a Call Center. An operator B-Tln of the Call Center is connected via an IAD with the aid of a switching systems Vst-A within the framework of a voice connection over an IP network IPnet to a subscriber A-Tln. For the purposes of making recorded announcements or to playback standard information content or dialogs, an IVR (interactive voice response) server IVRS is present in the area of responsibility of switching system Vst-A. Operator B-Tln decides for example with an incoming call, whether and when which standard information is to be played to the caller by the IVR server IVRS or which dialog is to execute. For a Call Center it will very frequently be the case that there is access to an IVR server IVRS which in conventional systems involves a significant volume of interoffice signaling zasig. FIG. 7 differs from the arrangement depicted in FIG. 6 merely in that the resource server IVRS is equipped for automatic voice output and that only one subscriber B-Tln, the operator, is depicted in the area of responsibility of the switching system Vst-A in FIG. 7.

With a typical application subscriber A-Tln who is in the area of responsibility of switching center Vst-B calls the IVR-server IVRS by dialing the service number of the Call Center. Because of the location of the A-subscriber A-Tln outside the area of responsibility of switching system Vst-A the useful data stream is being routed via the packet converter PU even as the connection is being set up. From the IVR server IVRS the call is switched between an operator of the Call Center B-Tln and the IVR server IVRS without interoffice signaling zasig outside the area of responsibility of the switching system Vst-A with the transit switching center Vst-D or the A-side local switching center Vst-B being necessary.

The invention claimed is:

1. A method for rerouting a useful data stream of a packet network based connection between a first subscriber and a second subscriber in a packet network within a framework of a service, comprising: providing at least one packet converter under control of a switching center; routing the useful data stream via the packet converter within the framework of the service; rerouting the useful data stream in the packet network, said rerouting step including disconnecting a data stream connection between the first subscriber and the packet converter; and conducting a packet conversion of the packets of useful data in the packet converter, the packet conversion including adaptations for rerouting of the useful data stream in the packet network, wherein the adaptations for rerouting of the useful data stream are selected from the group consisting of: changes of address and parameter information required for rerouting of the useful data stream;

wherein the packet converter includes program structures that emulate functions of a series connection of a packet network/TDM network network access device and a TDM network/packet network access device and for each through connection of a useful data stream to the packet converter from the switching center two orders or order sequences are signaled, with one relating to the conversion of a packet network data stream into a TDM data stream and one to the conversion of a TDM data stream into a packet network data stream.

2. The method in accordance with claim 1, wherein the service is implemented under the control and supervision of the switching center.

3. The method in accordance with claim 2, wherein the useful data is transmitted via a packet network based on an IP protocol, and changes to IP addresses required for rerouting the useful data stream are undertaken in the packet converter.

4. The method in accordance with claim 1, wherein the signaling information is routed in parallel to the useful data via a parallel switching network.

5. The method in accordance with claim 1, wherein the service is a telecommunications service, and the necessity of routing the useful data stream via the packet converter is determined on the basis of the packet network-related address information assigned to a directory number of a terminal involved or a subscriber-related device.

6. The method in accordance with claim 1, wherein rerouting of the useful data stream is undertaken within the framework of a conference circuit or an automatic voice output.

7. The method in accordance with claim 1, wherein: the packet converter is provided in a server of the packet network with packet-based useful data and signaling interfaces; said packet converter includes program structures that emulate functions of a the series connection of a the packet network/TDM network network access device and a the TDM network/packet network network access device; said packet network/TDM network network access device and the TDM network/packet network network access device are connected against each other with their TDM sides; and the server behaves like a series circuit of the packet network/TDM network network access device and the TDM network/packet network network access device.

8. The method in accordance with claim 1, wherein the packet converter is provided in subscriber equipment or network access equipment.

9. The method in accordance with claim 1, wherein the packet network/TDM network access device and the TDM network/packet network access device are connected against each other with their TDM sides.

10. The method in accordance with claim 1, wherein an assignment of packets to a TDM channel is dictated by a packet address of a subscriber equipment and wherein a subsequent assignment between the TDM channel and packets is undertaken with a destination address given by the rerouting of the useful data stream.

11. The method in accordance with claim 1, wherein the service is requested by the first or the second subscriber in the connection and wherein the service demands the rerouting of the useful data stream in the packet network.

12. The method in accordance with claim 11, wherein the service is one of Call Transfer, Call Hold, conference, interactive voice response, automatic speech output.

13. The method in accordance with claim 1, wherein no interoffice signalling is undertaken in the course of the rerouting of the useful data stream.

14. The method in accordance with claim 1, wherein in the framework of the rerouting the useful data stream in the section between a subscriber equipment assigned to the second subscriber and the packet converter is not changed.

15. The method in accordance with claim 1, wherein in the framework of the rerouting the useful data stream is diverted from the packet converter to a resource server or forwarded to the resource server.

16. A system having a switching center for rerouting a data stream in a packet network, comprising:
   an apparatus for performing adaptations for rerouting data streams in a packet network;
   said apparatus including program structures executed on at least one of a server of the packet network, a network access device and subscriber equipment to emulate functions of a series connection of a packet network/TDM network access device and a TDM network/packet network network access device, the packet network/TDM network network access device and the TDM network/packet network network access device being connected to each other at their TDM sides;
   said apparatus being logically connected to the switching center;
   said apparatus being adjustable and controllable by the switching center;
   a standardized protocol for exchanging signaling information between the switching center and the apparatus; and
   a resource server adjustable and controllable by the switching center.

17. The system in accordance with claim 16, wherein the protocol is selected from the group consisting of: a MGCP protocol, a H.248 protocol, and a H.323 protocol, is used to exchange the signaling information between the switching center and the apparatus.

18. The system in accordance with claim 16, wherein the standardized protocol is expanded with proprietary expansions.

19. The system in accordance with claim 16, further comprising:
   a second system, the second system including a second apparatus;
   said second apparatus including second program structures executed on at least one of a second server of the packet network, a second network access device and a second subscriber equipment to emulate second functions of a second series connection of a second packet network access device, the second packet network/TDM network network access device and the second TDM network/packet network access device being connected to each other with their TDM sides; and
   each system having a useful data stream adapted to be routed between the apparatus and the second apparatus over a packet network.

20. The system in accordance with claim 16, wherein functions of the apparatus are implemented in a server with signaling interfaces for connection to the switching center.

21. The system in accordance with claim 16, wherein functions of the apparatus are provided in a subscriber equipment or a network access device.

* * * * *